United States Patent
Begley et al.

(10) Patent No.: US 12,480,598 B2
(45) Date of Patent: Nov. 25, 2025

(54) SYSTEMS AND METHODS FOR DETERMINING VALVE FLUTTER

(71) Applicant: Hamilton Sundstrand Corporation, Charlotte, NC (US)

(72) Inventors: Patrick Begley, Boulder, CO (US); Myles R. Kelly, Willimantic, CT (US); Ronald D. Poisson, Longmeadow, MA (US); Robert Mackinnon, Portland, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 18/380,534

(22) Filed: Oct. 16, 2023

(65) Prior Publication Data

US 2025/0122951 A1 Apr. 17, 2025

(51) Int. Cl.
*F16K 37/00* (2006.01)
*F16K 15/03* (2006.01)

(52) U.S. Cl.
CPC .......... *F16K 37/0041* (2013.01); *F16K 15/03* (2013.01); *F16K 15/031* (2013.01); *F16K 15/033* (2013.01); *F16K 15/034* (2021.08); *F16K 15/035* (2013.01); *F16K 15/036* (2013.01); *F16K 37/0025* (2013.01); *F16K 37/0083* (2013.01)

(58) Field of Classification Search
CPC ...... F16K 15/03; F16K 15/031; F16K 15/033; F16K 15/034; F16K 15/036; F16K 15/035; F16K 15/038; F16K 37/0025; F16K 37/0041
See application file for complete search history.

(56) References Cited

U.S. PATENT DOCUMENTS

| | | | |
|---|---|---|---|
| 5,140,263 A | * | 8/1992 | Leon .................. F16K 37/0041 137/554 |
| 5,523,682 A | | 6/1996 | Leon |
| 6,283,138 B1 | | 9/2001 | Friend et al. |

(Continued)

FOREIGN PATENT DOCUMENTS

| | | | | |
|---|---|---|---|---|
| AU | 2010273649 B2 | * | 2/2015 | .......... A61M 5/1689 |
| CN | 2401740 Y | | 10/2000 | |

(Continued)

OTHER PUBLICATIONS

Extended European Search Report for European Patent Application No. 24206902.9, dated Mar. 5, 2025, 9 pages.

*Primary Examiner* — Atif H Chaudry
(74) *Attorney, Agent, or Firm* — Kinney & Lange, P.A.

(57) ABSTRACT

In accordance with at least one aspect of this disclosure, a system includes a first wire configured to electrically connect a valve stop to a voltage source, a second wire configured to connect a valve pin to a negative terminal of the voltage source, such that the valve stop, and a valve flap operatively connected to the valve pin are configured to create a closed valve circuit when the valve flap is in a fully open position with the valve flap contacting the valve stop, and an open valve circuit when the valve flap is not in the fully open position. A meter is operatively connected to measure an electrical characteristic of the valve circuit to determine when the valve flap is in the fully open position based on an open/closed status of the valve circuit.

12 Claims, 3 Drawing Sheets

(56) References Cited

U.S. PATENT DOCUMENTS

| | | |
|---|---|---|
| 7,165,547 B2 | 1/2007 | Truitt et al. |
| 10,677,375 B2 | 6/2020 | Ferrer Herrera et al. |
| 2008/0053537 A1* | 3/2008 | McGonigle ............... F16K 1/22 137/554 |
| 2019/0383414 A1 | 12/2019 | Brown et al. |

FOREIGN PATENT DOCUMENTS

| | | | |
|---|---|---|---|
| CN | 112049944 B | | 8/2022 |
| EP | 0121064 A1 | * | 10/1984 |
| EP | 3091301 A1 | | 11/2016 |
| WO | 2017101699 A1 | | 6/2017 |

* cited by examiner

SYSTEMS AND METHODS FOR DETERMINING VALVE FLUTTER

TECHNICAL FIELD

The present disclosure relates to valve systems and more particularly to systems and methods for measuring valve flutter, e.g., in the valve system.

BACKGROUND

Valve flutter and chatter in pneumatic applications are complex phenomena that can occur at low magnitudes and very high frequencies that are difficult to capture via standard instrumentation or camera tools due to tool sensitivity, for example.

There is an ever present need for improved systems and methods for capturing such valve flutter or chatter in pneumatic applications. This disclosure provides a solution for this need.

SUMMARY

In accordance with at least one aspect of this disclosure, a system includes a first wire configured to electrically connect a valve stop to a voltage source, a second wire configured to electrically connect a valve pin to a negative terminal of the voltage source, the voltage source, the valve stop, and a valve flap operatively connected to the valve pin configured to create a closed valve circuit when the valve flap is in a fully open position with the valve flap contacting the valve stop, and an open valve circuit when the valve flap is not in the fully open position. A meter disposed is operatively connected to measure an electrical characteristic of the valve circuit to determine whether the valve flap is in the fully open position based on an open/closed status of the valve circuit. In embodiments, the electrical characteristic is a voltage, e.g., a voltage drop. In certain embodiments, the valve can be a check valve.

The system can further include, a conduit configured to convey a fluid flow therethrough, a valve disposed in the conduit configured to block or allow flow through the conduit based on a position of the valve, the valve including the valve pin and one or more valve flaps operatively connected to pivot about the valve pin with the flow of the fluid through the conduit. The valve pin can be electrically isolated from the valve stop when the valve flap is not in the fully open position, e.g., within an electrically insulative housing.

In embodiments, the valve stop can be disposed in the conduit proximate a distal end of the one or more valve flaps such that the valve stop is configured to define the fully open position of the one or more valve flaps.

In certain embodiments, the one or more valve flaps can include two valve flaps, one valve flap being electrically conductive and one valve flap being electrically insulative. In certain such embodiments, the meter can be configured to measure the electrical characteristic of the valve circuit to determine when the electrically conductive valve flap is in the fully open position based on an open/closed status of the valve circuit, irrespective of the position of the electrically insulative valve flap.

In certain embodiments, the one or more valve flaps can include two valve flaps, both valve flaps being electrically conductive. In such embodiments, the meter can be configured to measure the electrical characteristic of the valve circuit to determine when the both valve flaps are in the full open position based on an open/closed status of the valve circuit.

In embodiments, the meter can be operatively connected between the first wire and the second wire and the electrical characteristic is a voltage. The valve can forms a resistor in the valve circuit and the meter can be configured to measure a voltage drop across the resistor (e.g., the valve) to determine whether the valve flap is in the fully open position based on the measured voltage drop compared to a known voltage of an open valve circuit.

In certain embodiments, each of the valve stop and the valve pin can be disposed in a central portion of the conduit and each valve flap can be configured to extend from the valve pin to a respective sidewall of the conduit in a closed position and pivot about the valve pin in a direction of flow to contact the valve stop with flow of the fluid flow through the conduit in the fully open position.

In certain embodiments, the system can include a first resistor disposed between the voltage source and the valve stop. The valve stop and valve pin can form a second resistor in series with the first resistor. In certain such embodiments, the meter can be configured to measure an electrical characteristic of the valve circuit to determine when the valve flap is in the fully open position or not in the fully open position based on an open/closed status of the valve circuit and/or based on a relative change in the electrical characteristic compared to a predetermined electrical characteristic of the fully open position. For example, the meter can be configured to measure a voltage drop across the first resistor or the second resistor (e.g., the valve) to determine whether the valve flap is in the fully open position based on the measured voltage drop compared to a known voltage of an open valve circuit.

In certain such embodiments, the one or more valve flaps can be a single valve flap. Each of the valve stop and the valve pin can be disposed on a first sidewall of the conduit, where the valve stop extends from the sidewall into the conduit. The valve flap can be configured to extend from the valve pin to a second sidewall of the conduit in a closed position and pivot about the valve pin in a direction of flow to contact the valve stop with flow of the fluid flow through the conduit in an open position in the fully open position.

In certain embodiments, the valve stop can be a first valve stop, and the system can further include a third wire configured to electrically connect between a second valve stop and the first wire. A first resistor can be disposed in the first wire between the voltage source and the first valve stop, a second resistor can be disposed in the third wire between the voltage source and the second valve stop, and a third resistor can be disposed in the second wire between the valve pin and the voltage source.

In certain such embodiments, the meter can be disposed in a fourth wire, parallel to the third resistor, configured to measure an electrical characteristic of valve circuit to determine when the valve flap is in the fully open position, the fully closed position, or between the fully open position and the fully closed position based on an open/closed status of the valve circuit and based on a relative change in the electrical characteristic compared to a predetermined electrical characteristic for each of the fully open position, the fully closed position, or between the fully open position and the fully closed position. Here, the electrical characteristic can be a voltage drop across the first resistor, the second resistor, the third resistor, or the valve. In embodiments, each of the first resistor, the second resistor, the third resistor can have different resistance values from each other and the known resistance value of the valve so that the valve position can be differentiated based on which stop the valve flap is in contact with The first valve stop can be disposed on a first sidewall in the conduit proximate a distal end of the one or more valve flaps such that the first valve stop is configured to define a maximum open flow position of the one or more valve flaps and the second valve stop can be disposed on a second wall in the conduit proximate a distal end of the one or more valve flaps such that the second valve stop is configured to define a the closed position of the one or more valve flaps.

In certain embodiments, the one or more valve flaps can include a single valve flap. Each of the valve stop and the valve pin can be disposed on the first sidewall of the conduit spaced apart from one another in a direction of flow through the conduit, the first valve stop extending from the sidewall into the conduit. The second valve stop can be disposed on the second side wall in line with the valve pin across the conduit, and extending into the conduit. The valve flap can be configured to extend from the valve pin to the second sidewall of the conduit in the closed position and pivot about the valve pin in a direction of flow to contact the first valve stop with flow of the fluid flow through the conduit in the fully open position and pivot about the valve pin in a direction opposite of flow in to contact the second valve stop in the closed position.

In certain embodiments, the system can include a controller configured to receive a signal from the meter indicative of the electrical characteristic, and determine the state of the valve based on the signal indicative of the electrical characteristic. In embodiments, the controller can be further configured to compare the determined state of the valve to a predicted state of the valve issue a notification to a user indicating the determined state of the valve is different than the predicted state of the valve.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
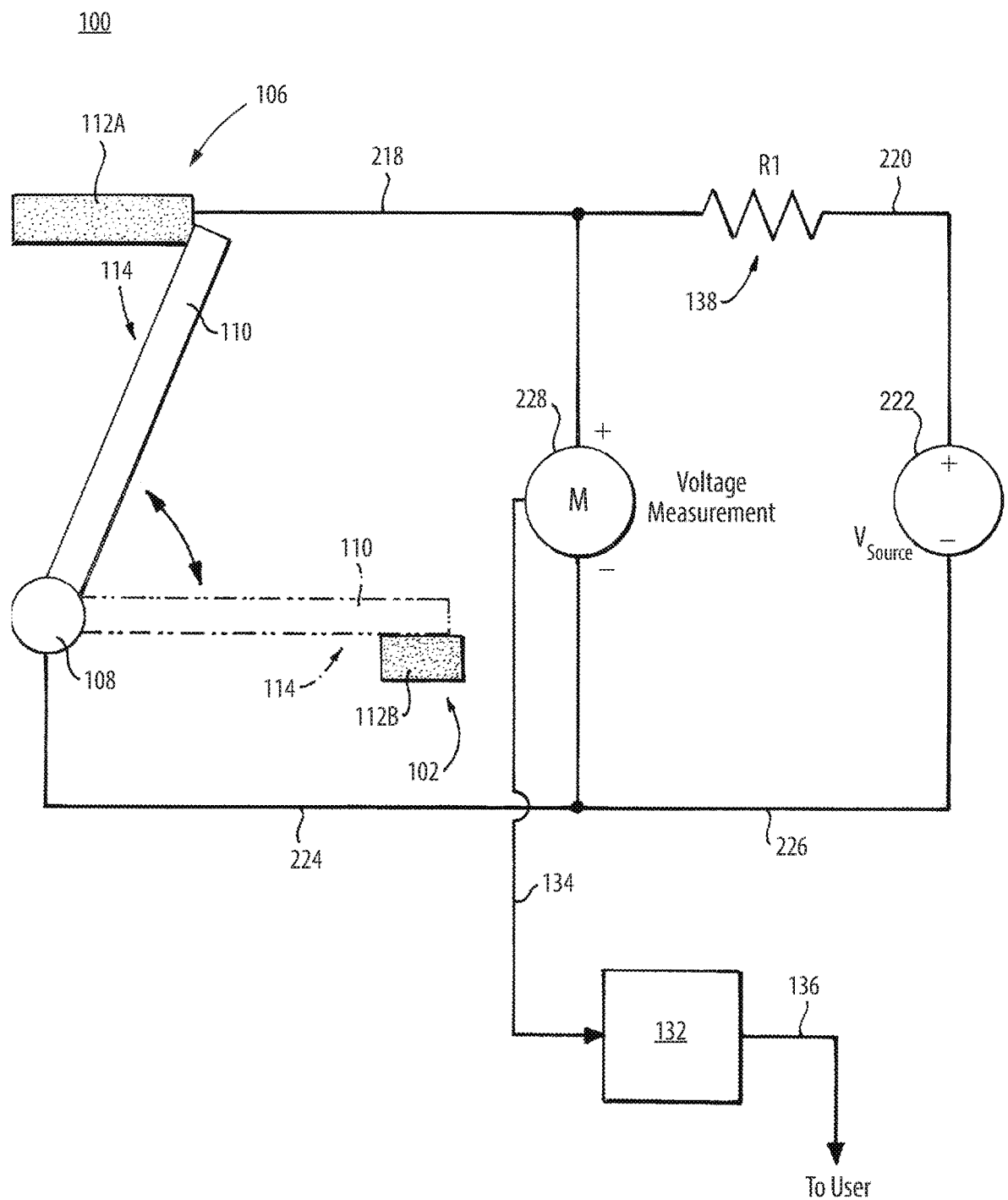
FIG. 1 is a schematic diagram of a system in accordance with this disclosure, showing an embodiment of a system having a valve and a detection system.
Figure 2:
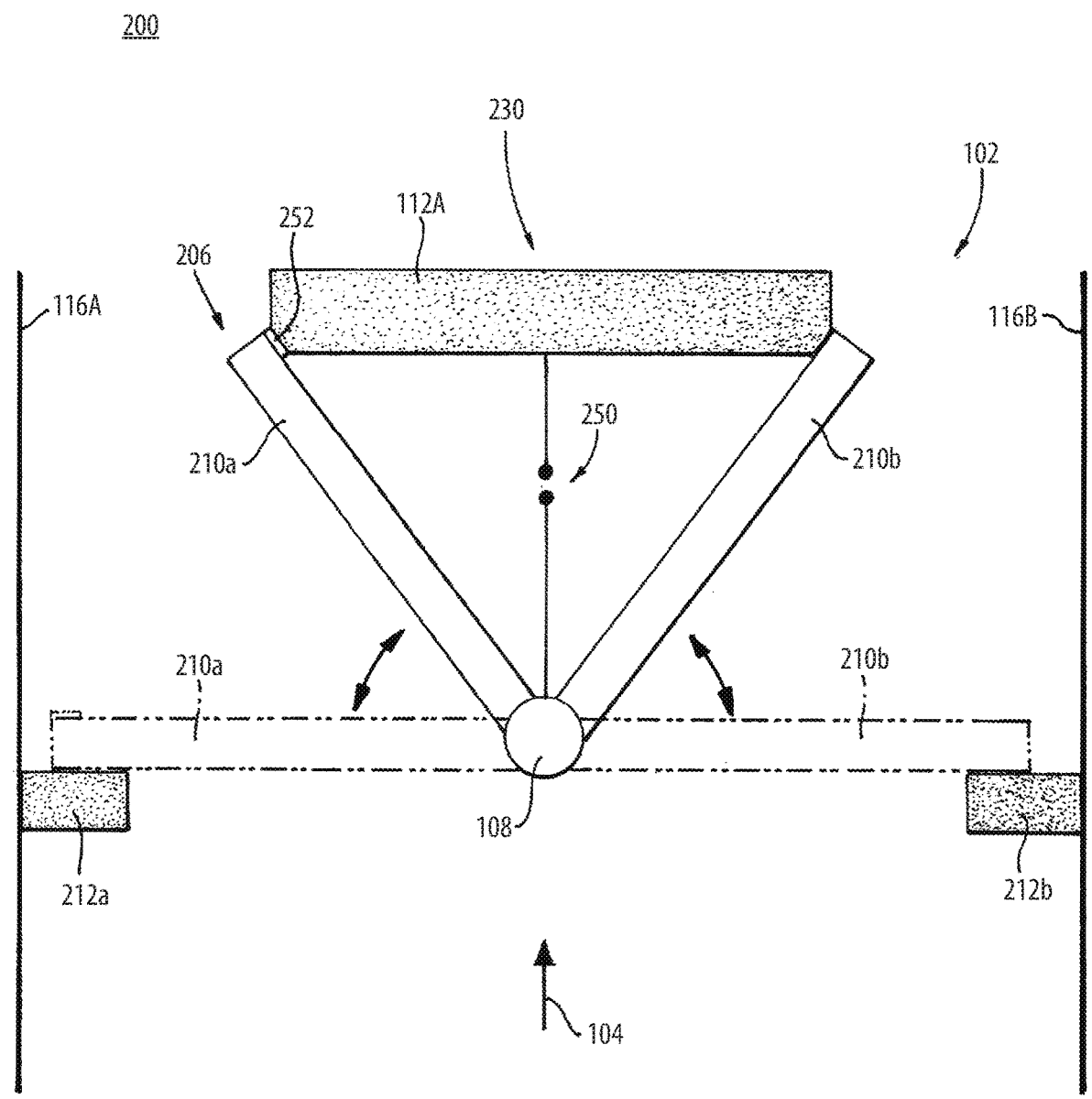
FIG. 2 is a schematic diagram of a system in accordance with this disclosure, showing another embodiment of a valve.
Figure 3:
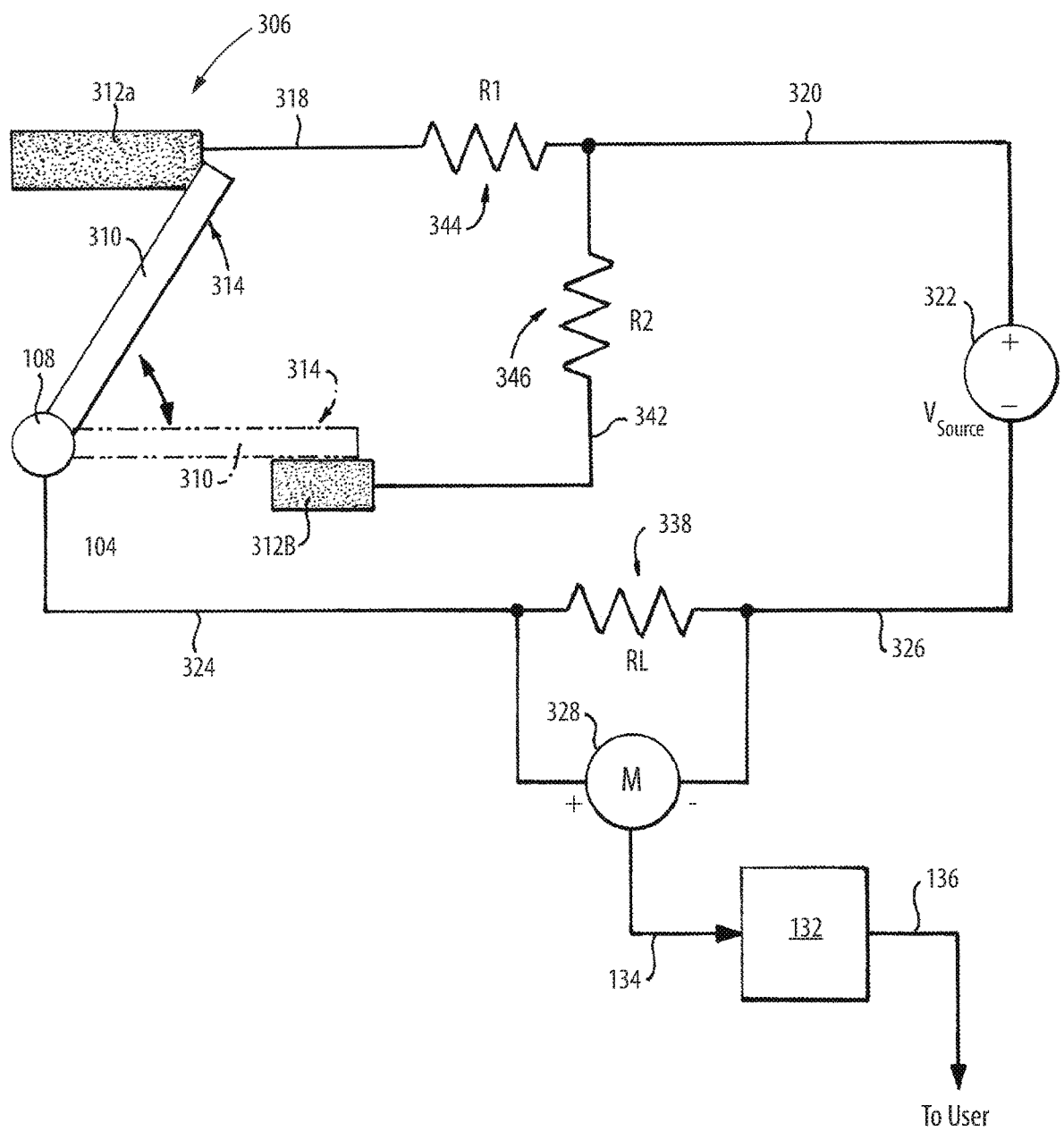
FIG. 3 is a schematic diagram of a system in accordance with this disclosure, showing another embodiment of a detection system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3. Certain embodiments described herein can be used to determine whether a valve is in its predicted position at a given time.

In accordance with at least one aspect of this disclosure, a system 100 can include a conduit 102 configured to convey a fluid flow 104 therethrough, and a valve 106 (e.g., a check valve) disposed in the conduit 102 configured to block or allow flow through the conduit 102 based on a position of the valve 106. The valve 106 includes a valve pin 108 one or more valve flaps 110 operatively connected to pivot about the valve pin 108 with the flow of the fluid 104 through the conduit 102, and one or more valve stops 112*a* 112*b*.

As shown in FIG. 1, in embodiments, the valve can include one valve flap 110 and two valve stops 112*a* and 112*b*. In such embodiments, the valve stops 112*a*, 112*b* can be disposed in the conduit 102 proximate a distal end 114 of the valve flap 110 such that the valve stop 112*a* defines a fully open valve position (e.g., with valve flap 110 in contact with valve stop 112*a*) and valve stop 112*b* defines a fully closed valve position (e.g., with valve flap 110 in contact with valve stop 112*b*). In the fully closed position, the distal end 114 of the valve flap 110 can extend from the valve pin 108, which is disposed on a first side wall 116*a*, across the conduit 102 to a respective sidewall 116*b* and contact the valve stop 112*b* so that in the closed position to block reverse flow from passing around the valve flas 110 in the fully closed position. In the fully open position, the valve flap 110 can swing about the valve pin 108 with flow until the valve flap contacts the valve stop 112*a*.

Still with reference to FIG. 1, a detection system 200, e.g., for detecting valve flutter in the valve 106, can be included in the system 100 to determine whether the valve 106 is in the fully open position, or not in the fully open position. As used herein, valve flutter means an unintended movement of the valve flap(s) 110 between positions where it is intended to operate. For example, if the valve is intended to be in the fully open position, but it is not, in the fully open position, the valve is determined to be fluttering.

As show in FIG. 1, the detection system 200 can include a first wire 218 configured to electrically connect the first valve stop 112*a* to a voltage source 222 (e.g., a power supply) and a second wire 224 configured to connect the valve pin 108 to a return of the voltage source 222. In certain embodiments, such as shown in FIG. 1, the valve stop 112*b* may not be electrically connected to the voltage source. Accordingly, the valve stop 112*a*, the valve flap 110 and the valve pin 108 are configured to create a closed valve circuit when the valve flap 110 is in the fully open position and contacting the valve stop 112*a*. An an open valve circuit is thus created when the valve flap 110 is not contacting the valve stop 112*a* and is any position other than fully open. In certain embodiments, the second wire 224 can be grounded, or in certain embodiments as shown, the second wire 224 can connect to a negative terminal of the voltage source 222.

The detection system 200 can also include a meter 228 connecting between the first and second wires configured to measure an electrical characteristic of the valve circuit to determine when the valve flap 110 is in the fully open position based on whether the valve circuit is closed or open. The electrical characteristic can be an amperage and/or a voltage, and/or a resistance. Measuring the relative change in the amperage, voltage, and/or resistance to a known value of the valve stop 112*a*, in addition to the open/closed status of the circuit, allows for determining if the valve flap 110 is moving in and out of the fully open position, e.g., fluttering, when it is predicted to be maintaining the fully open position. The detection system 200, in this respect, provides a binary position sensing, e.g., fully open or not fully open.

Still with reference to FIG. 1, the detection system 200 can include a first resistor 138 disposed in the first wire, between the valve stop 112a and the voltage source 222. The valve stop 112a and valve pin 108a can form a second resistor in series with the first resistor 138. In certain such embodiments, the meter 328 can be configured to measure an electrical characteristic of the valve circuit to determine when the valve flap 310 is in the fully open position based on the open/closed status of the valve circuit and/or based on a relative change in the electrical characteristic of the valve circuit (e.g., a voltage drop) compared to a predetermined electrical characteristic of the valve circuit for the fully open position. For example, when the valve flap 110 contacts valve stop 112b, Vmeter=Vsource, indicating that the valve circuit is closed and the valve is fully open. When the valve flap 110 is not contacting the valve stop 112a, Vmeter=0, indicating that the valve circuit is open, and the valve flap 110 is in some position other than fully open. Because the valve stop 112b is not electrically connected to the circuit, when the valve flap 110 contacts valve stop 112b, Vmeter will still read a 0 voltage because the valve circuit is open.

In certain embodiments, the system 100 can include a controller 132 configured to receive a signal 134 from the meter 228 indicative of the electrical characteristic. The controller can then determine the state of the valve 106 based on the signal 134 indicative of the electrical characteristic. For example, the controller 132 can be configured to compare the determined state of the valve 106 to a predicted state of the valve 106 and issue a notification 136 to a user indicating the determined state of the valve 106 is different than the predicted state of the valve 106 (e.g., the valve 106 should be fully open but the valve 106 is not fully open, or the valve 106 should not be fully open but it is fully open).

Referring now to FIG. 2, another embodiment of a valve 206 and detection system 300 is shown. The valve 206 can be similar to that of the valve 106, for example the valve 206 can have similar components and features with respect to the valve 106. For brevity, the description of common elements that have been described above for the valve 106 are not repeated with respect to the valve 206 as shown in FIG. 2. The detection system 200 can be implemented in a similar manner as described above with respect to the valve 106. As shown, the one or more valve flaps can include two flaps 210a, 210b. A single valve flap 112 can define the maximum open position for both flaps 210a, 210b, and two additional valve stops, 212a and 212b that respectively define the fully closed position for the valve flaps 210a, 210b. Here, the valve stop 112 and the valve pin 108 can be disposed in a central portion 230 of the conduit 102. The valve pin 108 should be electrically isolated from the valve stop 112a (the position to be measured) for example as shown schematically in FIG. 2 by arrow 250. This can be achieved by surrounding the valve pin in an electrically insulative housing.

In certain embodiments, one valve flap 210a can be electrically insulated from the valve stop 112a and one valve flap 210b can be electrically conductive. For example, as shown, the valve flap 210 can include an insulating portion 252 at the distal end thereof to prevent electrical connection with valve stop 112a in the fully open position. In certain such embodiments, the meter 228 can then measure the electrical characteristic of the valve circuit to determine when the electrically conductive valve flap 210b is in the fully open position based on an open/closed status of the valve circuit, irrespective of the position of the electrically insulative valve flap 210a. In the example shown in FIG. 2, when valve flap 210b is in contact with the valve stop 112a, Vmeter=Vsource, regardless of the position of the valve flap 210a, indicating that at least valve flap 210b is fully open. When valve flap 210b is not in contact with valve stop 112a, Vmeter will read 0V, indicating that valve flap 210b is fluttering, regardless of the movement of valve flap 210a.

In certain embodiments, not shown, both valve flaps 210a, 210b can be electrically conductive so that the meter 228 can measure the electrical characteristic of the valve circuit to determine when the both valve flaps 210a, 210b are in the fully open position based on the open/closed status of the valve circuit. In this example, when valve flap 210b is in contact with the valve stop 112a, and valve flap 210a is in contact with valve stop 112a, Vmeter=Vsource. If either one of valve flaps 210a, 210 are not in contact with valve stop 112a, Vmeter will read 0V, indicating that one or both of valve flaps 210a, 210b are fluttering.

Referring now to FIG. 3, another embodiment of a detection system 300 is shown. The detection system 300 can be similar to that of the detection system 200, for example the detection system 300 can have similar components and features with respect to the detection system 200. For brevity, the description of common elements that have been described above for the detection system 200 are not repeated with respect to the detection system 300 as shown in FIG. 2. The valve 306 can be implemented in the conduit in a similar manner to that of valve 106.

As shown in FIG. 3, the valve 306 includes first valve stop 312a disposed on the first sidewall 116a in the conduit 102 proximate second valve stop 312b disposed on the second wall 116b in the conduit 102. A third wire 342 is configured to electrically connect the second valve stop 312a to the first wire 318. A first resistor 344 (R1) is disposed in the first wire between the voltage source and the first valve stop 312a. The first valve stop 312a and the valve pin 108 can form a second resistor in series with the first resistor 344. A second resistor 346 (R2) can be disposed in the third wire 342 between the second valve stop 312b and the first wire 318. A third resistor 338 (RL) can be disposed in the second wire 324 between the valve pin 108 and the negative terminal of the voltage source 322. As shown, the meter 328 is disposed in a line parallel to the third resistor 338 to measure a voltage drop across the third resistor 338. Each of the three resistors can have different resistance values so that the controller 132 can differentiate between which valve stop the valve flap 110 is in contact with based on the measured voltage drop across the third resistor 338 as measured by the meter 328.

Accordingly, in this example, the meter 328 can be configured to measure an electrical characteristic of the valve circuit to determine when the valve flap 310 is in the fully open position, when the valve flap 110 is in the a fully closed position, and when the valve flap 110 is fluttering. For example, when the valve flap 310 is in contact with valve stop 312a, Vmeter=Vsource*RL/(R1+RL), indicating that the valve is in the fully open position. When the valve flap 310 is in contact with valve stop 312b, Vmeter=Vsource*RL/(R2+RL), indicating that the valve is in the fully closed position. When the valve flap 310 is not in contact with either of valve stops 312a, 312b, Vmeter=0, indicating that the valve flap 310 is fluttering and is in some position between fully open and fully closed.

Embodiments allow for high-frequency, high-accuracy electrical measurement of the flutter of a valve (e.g., valve 106, 206, 306). Embodiments also allow for modification of the circuit continuity sensor to allow for independent detection of multiple valve positions (e.g., only fully open, both fully open and fully closed, and/or a position between the two. While embodiments described herein show valves 106, 206, 306 as being a flapper-style check valve, one having ordinary skill in the art having the benefit of this disclosure would readily appreciate that embodiments of the detection system can be applied to other valve types.

Embodiments of a system includes a detection and measurement system provide for measurement of valve position using electrical continuity, where specific positions of a valve change the characteristics of a circuit to a detectable level. Many valves utilize forms of a "stop" wherein the flow control material (e.g. flapper, plug, disk) contacts a fixture that prevents further movement of the control material, often at a full-closed or full-open position. Embodiments can create an open or closed circuit independent of the valve, and then connect that circuit to various elements of the valve corresponding to certain valve positions, changes in valve position will lead to a measurable change in circuit characteristics. Thus, the circuit characteristics provide positional feedback for the valve. In embodiments, the valve elements that connect to the nodes of the circuit should be completely electrically isolated from one another (e.g., as described with respect to FIG. 2). Techniques for achieving electrical isolation are included in this document In certain embodiments, e.g., a single positional feedback application, the circuit includes a power supply of a known voltage and a multimeter to measure voltage. The circuit is open when the valve flaps do not contact the stop fixture (e.g., the valve stop) and the circuit is closed when the valve flap(s) do contact the fixture. The power supply voltage is read when electrical continuity is achieved when the valve flap achieves contact with the valve stop (full-open) position. In certain applications, e.g., dual-disk applications as shown in FIG. 2, positional feedback may be provided for both valves simultaneously (if both disks are electrically conductive) or single-disk feedback can be provided when only one disk is electrically conductive.

Certain embodiments can provide for dual positional feedback, for example as shown in FIG. 3. In FIG. 3, a single-disk valve is shown and there are two stop positions both connected to the circuit with different resistor values. The measured value of the voltage at the multimeter will change according to the position of the valve. While the systems of FIGS. 1 and 3 are shown with respect to single disk valves, it is contemplated that any embodiment of a system described herein can be suitable for either a double or single disk valve as needed for a given application.

Conventionally, imaging devices, pressure sensors, or accelerometers could be used to determine valve flutter, however due to the valves being largely surrounded by metallic components, and within large systems of existing duct work, imaging devices may not be suitable to visually capture the flutter. Pressure sensors and accelerometers may be able to overcome the duct work challenges, however, they are more complicated systems than the electrical continuity approach discussed herein.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "controller." A "circuit," "module," or "controller" can include one or more portions of one or more separate physical hardware and/or software components that can together perform the disclosed function of the "circuit," "module," or "controller", or a "circuit," "module," or "controller" can be a single self-contained unit (e.g., of hardware and/or software). Furthermore, aspects of this disclosure may take the form of a computer program product embodied in one or more computer readable medium(s) having computer readable program code embodied thereon.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
   a conduit configured to convey a fluid flow therethrough;
   a valve disposed in the conduit configured to block or allow flow through the conduit based on a position of the valve, the valve including a valve pin and two valve flaps operatively connected to pivot about the valve pin with the flow of the fluid through the conduit, wherein the two valve flaps include an electrically conductive valve flap and an electrically insulative valve flap;
   a valve stop disposed in the conduit proximate a distal end of the two valve flaps such that the valve stop is configured to define the fully open position of the two valve flaps;
   a first wire configured to electrically connect the valve stop to a voltage source;
   a second wire configured to electrically connect the valve pin to a return of the voltage source, wherein the voltage source, the valve stop, and the electrically conductive valve flap operatively connected to the valve pin are configured to create a closed valve circuit when the electrically conductive valve flap is in a fully open position with the electrically conducitve valve flap contacting the valve stop, and an open valve circuit when the electrically conductive valve flap is not in the fully open position; and
   a meter operatively connected to measure an electrical characteristic of the valve circuit to determine whether the electrically conductive valve flap is in the fully open position based on an open/closed status of the valve circuit.

2. The system of claim 1, wherein the valve pin is electrically isolated from the valve stop when the electrically conductive valve flap is not in the fully open position.

3. The system of claim 1, wherein the meter is operatively connected between the first wire and the second wire and the electrical characteristic is a voltage, wherein the valve forms a resistor in the valve circuit, wherein the meter is configured to measure a voltage drop across the resistor to determine whether the valve flap is in the fully open position based on the measured voltage drop compared to a known voltage of an open valve circuit.

4. The system of claim 1, wherein each of the two valve stops and the valve pin are disposed in a central portion of the conduit, wherein each of the two valve flaps is configured to extend from the valve pin to a respective sidewall of the conduit in a closed position and pivot about the valve pin in a direction of flow to contact the valve stop with flow of the fluid flow through the conduit in the fully open position.

5. The system of claim 1, wherein the meter is operatively connected between the first wire and the second wire and further comprising a first resistor disposed in the first wire between the voltage source and the valve stop, wherein the valve stop and valve pin form a second resistor in series with the first resistor, wherein the meter is configured to measure an electrical characteristic of the valve circuit to determine when the electrically conductive valve flap is in the fully open position or not in the fully open position based on an open/closed status of the valve circuit and/or based on a relative change in the electrical characteristic compared to a predetermined electrical characteristic of the fully open position.

6. The system of claim 5, wherein the electrical characteristic is a voltage, wherein the meter is configured to measure a voltage drop across the second resistor to determine whether the valve flap is in the fully open position based on the measured voltage drop compared to a known voltage of an open valve circuit.

7. The system of claim 1, wherein the valve stop is a first valve stop, and further comprising:
   a third wire configured to electrically connect between a second valve stop and the first wire;
   a first resistor disposed in the first wire between the voltage source and the first valve stop;
   a second resistor disposed in the third wire between the voltage source and the second valve stop; and
   a third resistor disposed in the second wire between the valve pin and the voltage source,
   wherein the meter is disposed in a fourth wire configured to measure an electrical characteristic of the valve circuit across the third resistor to determine when the electrically conductive valve flap is in the fully open position, the fully closed position, or between the fully open position and the fully closed position based on an open/closed status of the valve circuit and based on a relative change in the electrical characteristic compared to a predetermined electrical characteristic for each of the fully open position, the fully closed position, or between the fully open position and the fully closed position.

8. The system of claim 7, wherein each of the first resistor, the second resistor, and the third resistors have different resistance values, and wherein the electrical characteristic is a voltage drop across the first resistor, the second resistor, the third resistor, or the valve.

9. The system of claim 7,
   wherein the first valve stop is disposed on a first sidewall in the conduit proximate the distal end of the two valve flaps such that the first valve stop is configured to define a maximum open flow position of the one or more valve flaps and wherein the second valve stop is disposed on a second wall in the conduit proximate the distal end of the two valve flaps such that the second valve stop is configured to define a the closed position of the two valve flaps.

10. The system of claim 1, wherein the valve is a check valve.

11. The system of claim 1, further comprising, a controller configured to:
    receive a signal from the meter indicative of the electrical characteristic; and
    determine the state of the valve based on the signal indicative of the electrical characteristic.

12. The system of claim 11, wherein the controller is further configured to: compare the determined state of the valve to a predicted state of the valve; and issue a notification to a user indicating the determined state of the valve is different than the predicted state of the valve.

* * * * *